April 18, 1967  J. H. AUER, JR  3,315,065
APPARATUS FOR MEASURING AND RECORDING
VEHICULAR TRAFFIC PARAMETERS
Filed Dec. 12, 1962  4 Sheets-Sheet 4
FIG. 3A
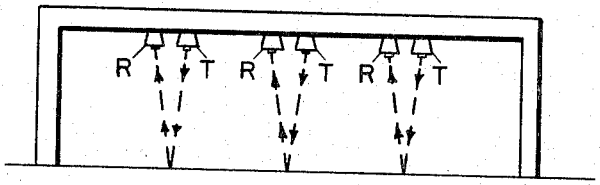
FIG. 3B
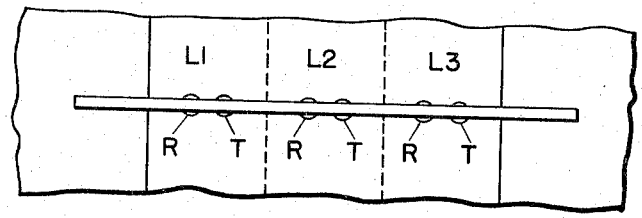
FIG. 4  VEHICLE PRESENCE DETECTOR
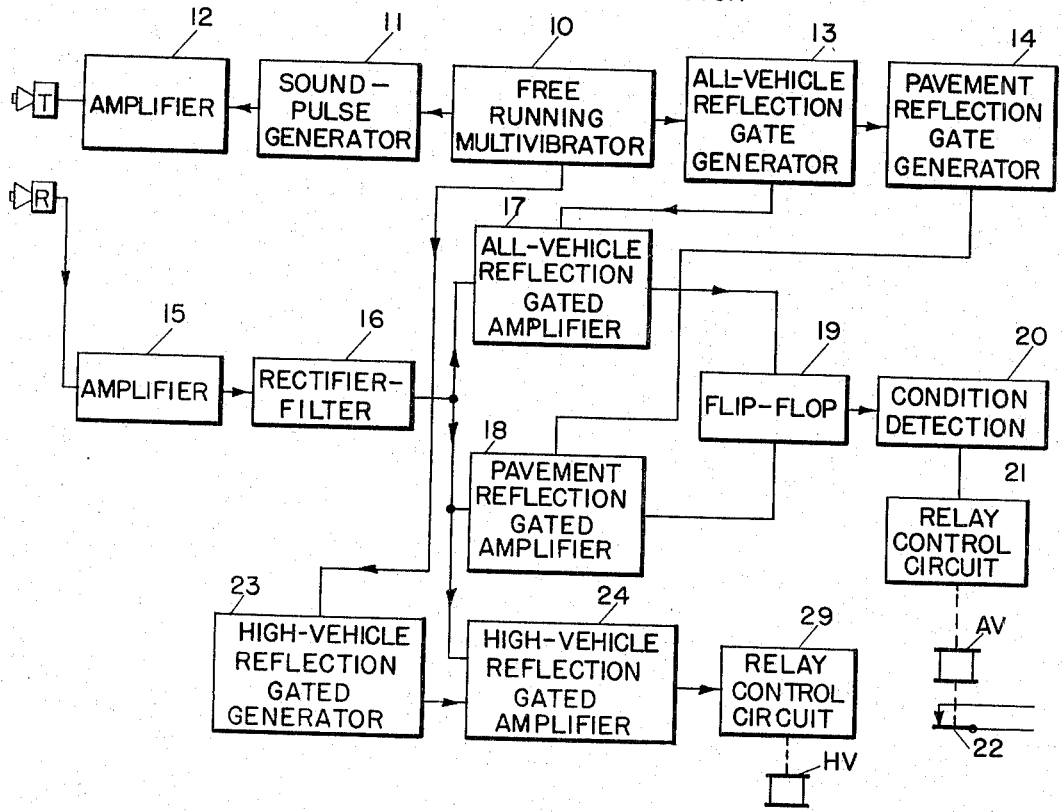
INVENTOR.
J.H. AUER JR.
BY
HIS ATTORNEY

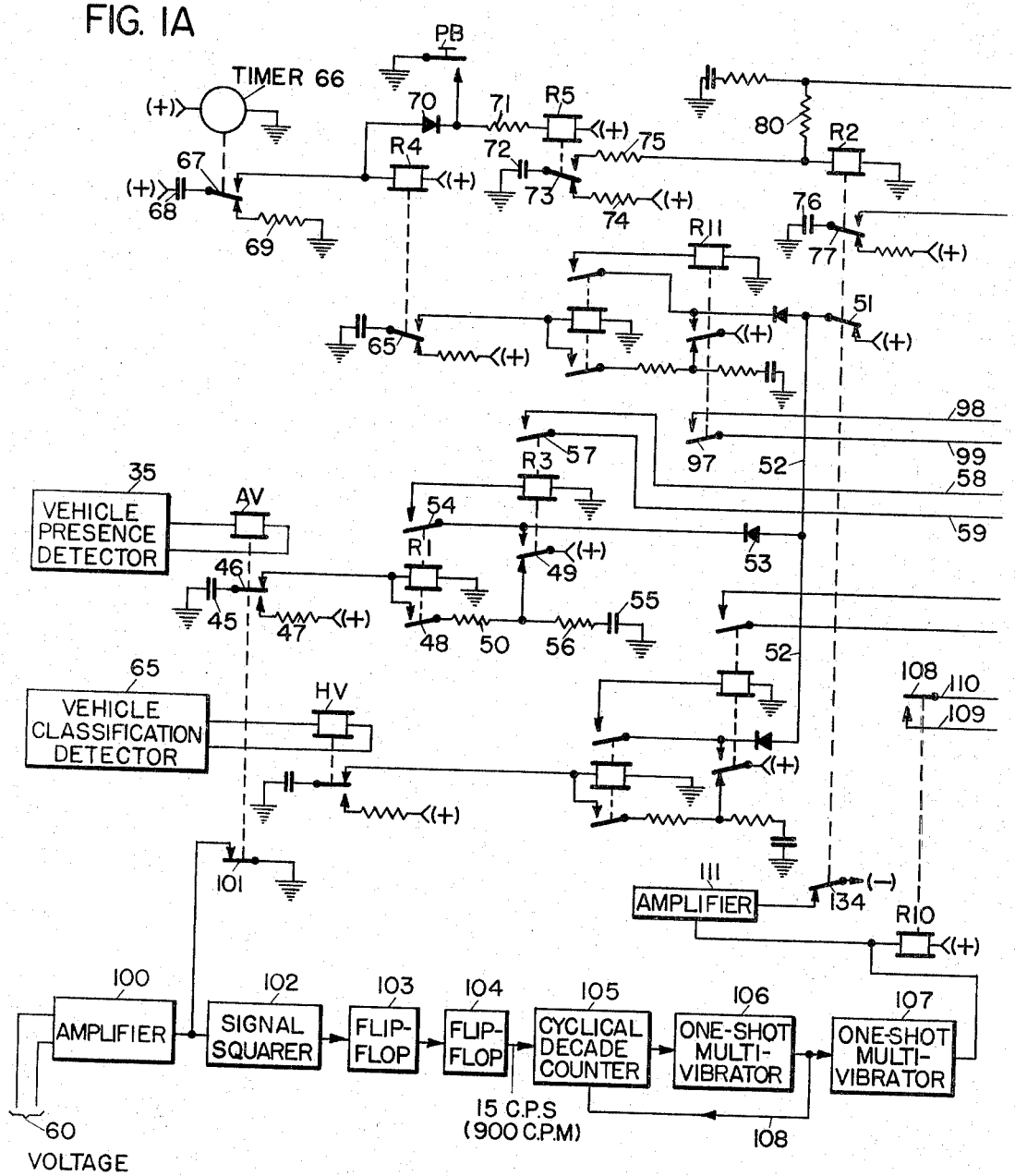

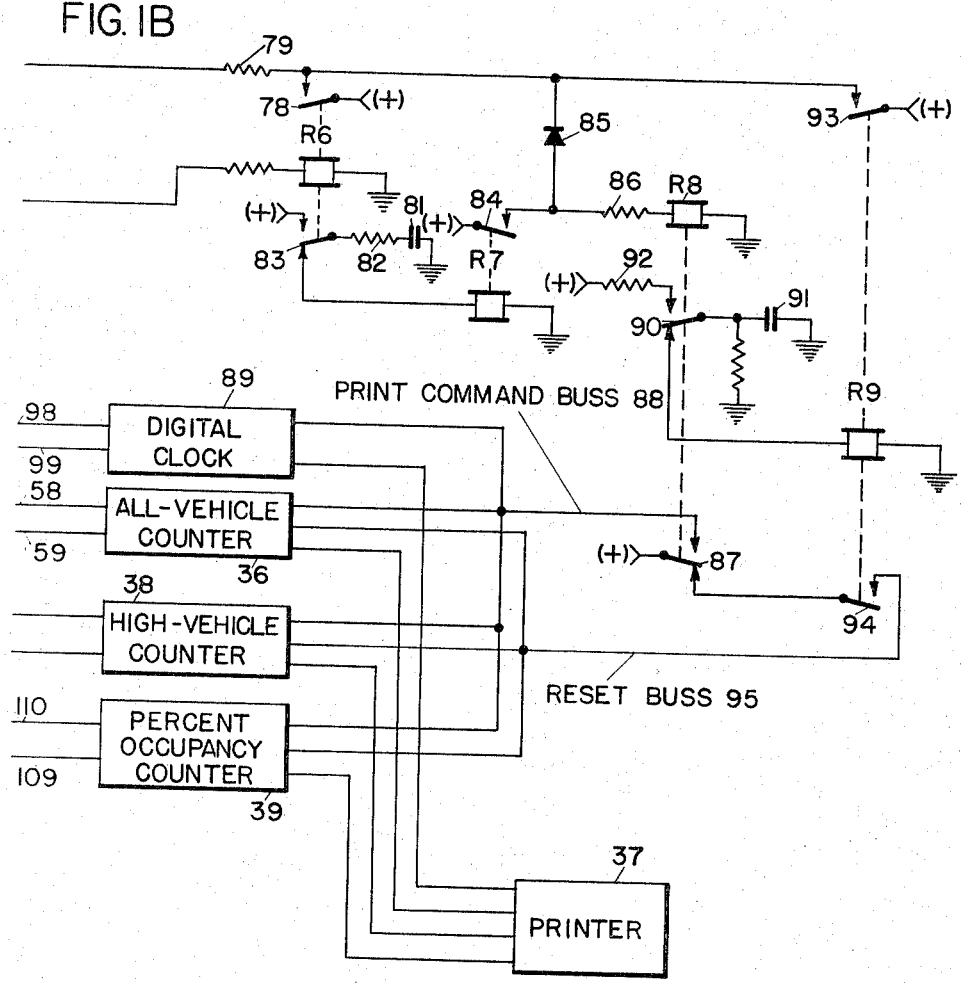
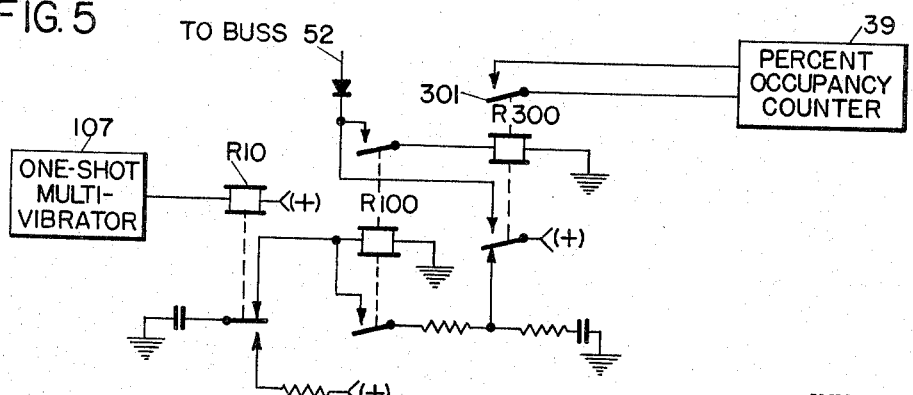

United States Patent Office 3,315,065
Patented Apr. 18, 1967

3,315,065
APPARATUS FOR MEASURING AND RECORDING VEHICULAR TRAFFIC PARAMETERS
John H. Auer, Jr., Rochester, N.Y., assignor to The General Signal Corporation, Rochester, N.Y., a corporation of New York
Filed Dec. 12, 1962, Ser. No. 244,171
17 Claims. (Cl. 235—150.24)

This invention relates to apparatus for measuring vehicular traffic parameters, and more particularly, relates to apparatus for measuring and recording digital representations of traffic volume and occupancy.

It has been found necessary to analyze traffic condition on highways so that remedial measures may be put into effect before traffic congestion exceeds certain predetermined limits, since it has found that if these maximum values are exceeded, the ability of the highway to move traffic effectively is substantially reduced. Moreover, analysis of traffic conditions is also important to obtain a clear picture as to the use to which existing highways are being put so that there can be intelligent planning as to future highway needs. This makes it desirable to provide data as to traffic volume, occupancy, et cetera. In the prior patent application of H.C. Kendall et al, Ser. No. 78,410, filed Dec. 27, 1960, now Patent No. 3,233,084, and assigned to the assignee of the present invention, I have disclosed apparatus which measures these traffic parameters and provides analog rather than digital representations thereof. Although the analog representations are in many cases entirely adequate, it is at times preferable to provide instead digital representations of these parameters, particularly when it is desired to provide a permanent record in the form of a tape or punched cards. Such a record makes it possible to conduct a careful analysis of traffic conditions.

It has long been recognized in the art that traffic volume, i.e., number of vehicles per unit time, is a traffic parameter which provides at least a partial indication of traffic congestion. Accordingly, the apparatus of the present invention included means for continually measuring and recording a digital representation of traffic volume. In the prior application Ser. No. 78,410, now Patent No. 3,233,084, already referred to, there is pointed out some of the inherent disadvantages of using only traffic volume data to measure traffic congestion. Thus, when traffic congestion is at a peak and it is then most critically important to have an accurate determination of traffic congestion, traffic volume may very substantially decrease since the average velocity of the traffic then becomes substantially less and the number of vehicles per unit time passing the monitoring location becomes quite small and may even approach zero under bumper-to-bumper traffic conditions when traffic is virtually at a standstill. It is for this reason that it becomes highly desirable to measure traffic occupancy, i.e., the percentage of pavement occupied since, under heavy traffic conditions, this parameter, unlike the volume parameter, will reach a maximum, and will approach 100 percent when traffic is bumper-to-bumper and virtually stopped. Consequently, the apparatus of the present invention is so organized as to measure and record digital representation of traffic occupancy and/or traffic volume with the understanding that a record of both of these parameters will necessarily provide a much more accurate determination as to traffic congestion than will merely a measure of traffic volume alone.

Therefore, it is an object of this invention to provide apparatus which periodically provides a digital representation of traffic lane occupancy.

It is another object of the present invention to provide apparatus which periodically provides a digital representation of traffic volume.

It is another object of the present invention to provide an apparatus which periodically measures and records a digital representation of both traffic volume and lane occupancy.

Other objects, purposes, and characteristic features of the invention will in part be obvious from the accompanying drawings and, in part, pointed out as the description of the invention progresses.

In describing the invention, reference will be made to the accompanying drawings in which:

FIG. 1A and FIG. 1B, when placed with FIG. 1B to the right of FIG. 1A, comprise a circuit diagram of the digital traffic volume and lane occupancy measuring and recording apparatus;

FIGS. 3A and 3B and FIG. 4 illustrate vehicle-sensing apparatus which may be used to provide the required inputs to the apparatus of FIGS. 1A and 1B; and FIG. 5 is an abbreviated figure showing how the percent occupancy counter of FIG. 1B can be controlled by relay R10 of FIG. 1A in a modified way.

*General system description—FIGS. 1A and 1B*

Figure 2:
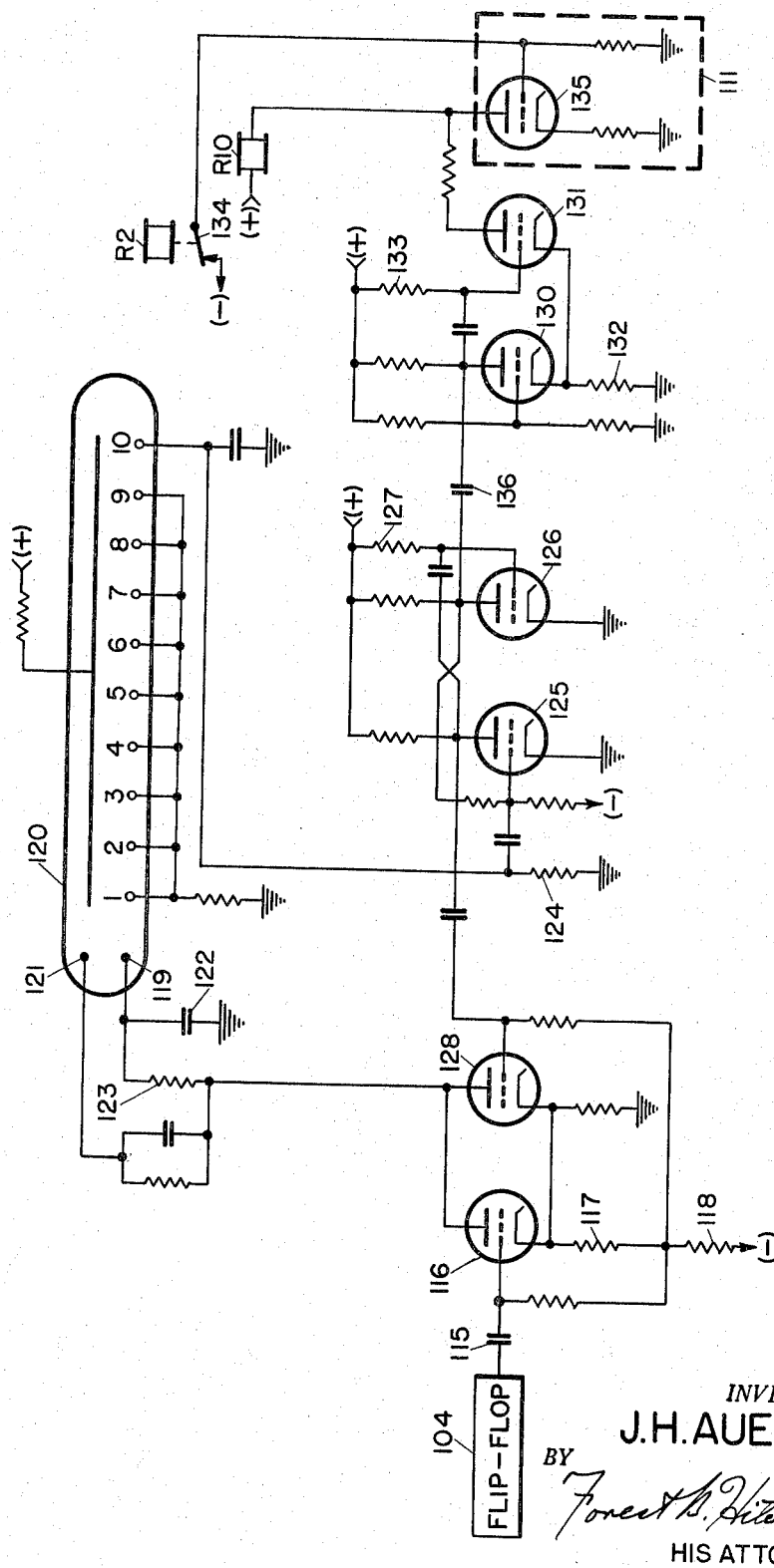
FIG. 2 is a circuit diagram of a portion of the apparatus which, for convenience, has been shown in block diagram form in FIG. 1A.

Referring first to FIG. 1A, a vehicle-presence detector 35 is shown which normally holds an associated all-vehicle relay AV energized. This relay is released for each vehicle detected as passing the monitoring location and remains released for a period of time closely corresponding to the length of time required for the vehicle to pass the monitoring location. As will later be described, each actuation of relay AV is counted by the all-vehicle counter 36 of FIG. 1B. At periodic intervals, the count registered by counter 36 is recorded upon a paper tape or a punched card by the printer 37. When thus recorded, the count registered by counter 36 is erased so that this counter can then register the number of vehicle detections occurring in the interval then starting. Accordingly, if counter 36 is controller to record its count once each minute, printer 37 will record on the tape or card a series of numbers, each representing the measured vehicle volume in terms of vehicles per minute for each of a succession of one-minute measuring periods. Since relay AV is actuated for each and every vehicle detected, the count recorded by printer 37 will represent all of the vehicles detected at the monitoring location each minute.

It is at times desirable to record separately the volume of trucks which pass the monitoring location. A quite accurate measurement of this parameter may be obtained by using a vehicle classification detector 65 which actuates an associated relay HV only in response to the passage of a vehicle having a height substantially greater than the average height of an automobile. Consequently, the number of actuations of relay HV occurring during any given measuring interval quite closely corresponds to the number of trucks which pass the monitoring location. As will be seen, the number of actuations of relay HV is recorded by the high-vehicle counter 38, and periodically the counts registered by this counter 38 are also printed by printer 37 so that a record is obtained of the number of high vehicles per unit time passing the monitoring location.

When only traffic volume data is desired, it is only necessary that the vehicle detector respond in some distinctive manner to each passing vehicle in order that one additional count can be recorded upon the associated counter, and it is not necessary that the detector, under those circumstances, be a so-called "presence detector" as disclosed in FIG. 1A. However, in order to obtain a measurement of lane occupancy, it is necessary to use a presence detector and, since the embodiment of FIGS. 1A and 1B is intended to show how lane occupancy may be measured digitally, the detector 35 has been shown as being of the presence detecting type. Obviously, if a presence type detector is provided to make it possible to obtain lane occupancy measurements, this same detector may also be used to provide the required vehicle counts to the all-vehicle counter 36 even though a non-presence type of detector such as a treadle or the like might well be used in conjunction with counter 36.

Described briefly, it is contemplated by the present invention to provide a digital measurement of lane occupancy by making a digital measurement of the cumulative amount of time throughout any measuring interval that the detector 35 is detecting the presence of a vehicle. Assuming that the basic measuring interval in the system is one minute, a source of counting pulses having a repetition rate of 100 pulses per minute is selectively applied to the percent occupancy counter 39. Throughout any interval that the detector 35 is detecting the presence of a vehicle, the pulses are applied to counter 39 and counted. At the end of each one-minute interval, the count then registered by counter 39 is printed upon the record by printer 37. To illustrate, if no vehicles are detected by detector 35 during any one-minute measuring interval, no pulses are applied to counter 39 and zero percent occupancy is printed by printer 37. On the other hand, if the vehicles along the lane were so closely spaced that a continuous vehicle detection would be registered by detector 35, 100 pulses would be applied to counter 39 during each one-minute measuring interval and a 100 percent lane occupancy indication would be printed by printer 37. If detector 35 detects the presence of vehicles for one-half of any one minute measuring period, 50 pulses are applied to counter 39 in that minute and a fifty percent occupancy indication is printed by printer 37. The foregoing description makes it clear that there is recorded periodically on the tape a digital representation of the percentage of time that relay AV is released during the measuring interval.

The foregoing description, although accurately portraying the manner of operation of this invention in a very general way, nevertheless, does not take into account the special problems which arise as a result of the actual values of car length and car speed encountered in actual practice. To illustrate, assuming that an average vehicle has a length of about 18 feet and may pass through the detection zone of the presence detector with a velocity of 60 m.p.h., the detection interval will be roughly one-fifth of a second. Obviously, it is not practical to apply directly to counter 39 the previously-mentioned pulses with the 100 per minute repetition rate since it is very likely that not even one pulse would be counted in the one-fifth second detection interval and, in any event, such a low pulse repetition rate would not permit an accurate measurement of the detection interval. To take care of this situation, the preferred embodiment of the invention illustrated herein employs a source of pulses having a much higher pulse repetition rate such that a fairly substantial number of pulses will occur even in the minimum vehicle detection interval that may be expected as when a relatively short vehicle passes at maximum speed through the detection zone. An intermediate counter is provided which counts these high frequency pulses only throughout each interval that a vehicle is detected as being within the detection zone. Because of the high frequency of these pulses, the number of pulses counted by the intermediate counter for each vehicle detected establishes with a high degree of resolution the detection time for each vehicle. Each time that the intermediate counter reaches some predetermined counting condition, a pulse is applied to counter 39. Both the initial, high pulse frequency and the pulse division effect which results by the feeding of a pulse to counter 39 only for each predetermined number of pulses counted by the intermediate counter are so selected that the desired counting rate of counter 39 is obtained. As one example of this, assume that the pulses are generated with a repetition rate of one thousand per minute. These pulses are applied to the intermediate counter throughout each interval that a vehicle is detected by the presence detector. If the intermediate counter is a scale-of-ten counter, supplying one output pulse to counter 39 for each complete cycle, counter 39 will receive pulses at the rate of 100 per minute and the count that counter 39 registers at the end of each one-minute interval will represent, to the nearest percent, the percentage of time that the vehicle presence detector was registering the presence of a vehicle in the just-ended one-minute interval.

To demonstrate that the percentage of detection time provides a close approximation of lane occupancy, i.e., percent of lane occupied, it will be assumed that in time T, $n$ vehicles pass the detector and that their individual velocities are $v_1$, $v_2$, and $v_3 \ldots v_n$. Consequently, the average velocity of the $n$ vehicles equals $$V_A = \frac{v_1 + v_2 + v_3 \ldots v_n}{n}$$

Throughout the predetermined observation time T, the average length L of the road which is occupied by the $n$ vehicles (together with the empty spaces between successive vehicles) is equal to the average velocity $v_A$ multiplied by the observation time T, i.e., $L = v_A \times T$. L, in other words is the length of the segment of traffic scanned by the detector in time T when that traffic has an average velocity $v_A$.

If the length of road required to accommodate the $n$ vehicles when they are bumper-to-bumper is $L_s$, then $L_s = l_1 + l_2 + l_3 \ldots + l_n$ where $l$=vehicle length. Occupancy defined as fraction of the road covered is then equal to $$\frac{L_s}{L} = \frac{l}{v_A T}(l_1 + l_2 + l_3 \ldots + l_n)$$

On the other hand, total detection time of the vehicle detector for the $n$ vehicles equals $$t = \frac{l_1}{v_1} + \frac{l_2}{v_2} + \frac{l_3}{v_3} \ldots + \frac{l_n}{v_n}$$

At the same time, percent detection time $t/T$ may be expressed as follows:

$$\frac{t}{T} = \frac{1}{T}\left(\frac{l_1}{v_1} + \frac{l_2}{v_2} + \frac{l_3}{v_3} \ldots + \frac{l_n}{v_n}\right) = \frac{1}{V_A T}$$

$$\left(l_1 \cdot \frac{v_A}{v_1} + l_2 \cdot \frac{v_A}{v_2} + l_3 \cdot \frac{v_A}{v_3} \ldots + l_n \frac{v_A}{v_n}\right)$$

A comparison of the equation for the percentage detection time with the equation for traffic occupancy reveals that they are generally similar and become identical when all of the vehicles travel at the same velocity since then $$V_1 = V_2 = V_3 = V_n = V_A$$

As the spread of vehicle velocities increases, accuracy tends to decrease. However, for a typical situation where vehicles are of varying lengths and with velocities not varying too widely, it has been found that the percentage of detection time as represented by the count registered by counter 39 very closely approximates the traffic occupancy as represented in the above equation.

Accuracy in measurement of traffic occupancy becomes increasingly important for higher occupancy values since it is under such circumstances that it is ordinarily desired to take remedial measures. However, at such time there is little likelihood that the speeds of individual vehicles will vary widely from the average speed. For this reason, measurement of the percentage of detection time provides accurate results for high values of traffic occupancy.

*Vehicle presence detector—FIGURES 3A, 3B, 4*

It will be apparent to one skilled in the art that various types of presence detectors may be used such as a tuned coil embedded in the pavement, a photocell system, or the like. I have found it highly desirable to use a presence detector in which vehicle presence is determined by the length of time required for a vehicle to pass through a detection zone defined by a beam of sound pulses directed across the path of the vehicles. Thus, FIGS. 3A and 3B illustrate a possible arrangement of the vehicle detection apparatus, including the electro-acoustic transducers which may be used for each of three parallel highway lanes when the vehicle detection apparatus is of the pulsed ultrasonic type. In a vehicle detection system of this type, which is disclosed in detail in Kendall et al. Patent No. 3,042,303 issued July 3, 1962, repetitive sound pulses, each of short duration such as one millisecond, are transmitted downwardly from a transmitting transducer T toward the pavement and impinge, in the absence of any vehicle, upon the surface of the roadway. They are then reflected back toward a receiving transducer R. When a vehicle intercepts the relatively narrow beam of sound pulses, the sound pulses can no longer impinge upon the pavement but then impinge upon the upper sound reflecting surfaces of the vehicle. Incidentally, the repetition rate of the pulses is sufficiently slow to provide enough time between successive pulses to permit each reflected pulse to be received by the receiving transducer before the next sound pulse is transmitted. This latter requirement eliminates ambiguity since each reflection pulse is then definitely related to the last-transmitted sound pulse.

The round-trip propagation time of a reflection pulse is affected considerably by whether or not there is a vehicle present within the sound beam. When no vehicle is present, each sound pulse has a maximum propagation time, but when a vehicle is present the propagation time in considerably reduced. This difference in propagation time makes it possible to distinguish between pavement and vehicle reflection pulses and thereby detect that a vehicle is within the sound beam. Since the detected condition persists as long as the vehicle occupies the sound beam, the duration of this condition represents the length of time required for a vehicle to pass the detection location defined by the sound beam.

In FIG. 4, the apparatus provided for generating the repetitive sound pulses comprises a free-running multivibrator 10 whose frequency of operation establishes the pulse repetition rate. For each cycle of its operation, the multivibrator 10 applies a triggering pulse to the sound pulse generator 11. The generator 11 then produces a brief pulse of ultrasonic frequency energy which is amplified by amplifier 12 and applied to the transmitting transducer T, thereby causing a corresponding sound pulse to be transmitted toward the pavement. Electronic gating circuits are employed and each demarcates a successive time interval, with the first of these being driven by multivibrator 10. The first of these gating circuits, the all-vehicle reflection gate generator 13, demarcates a time interval which encompasses that period of time after the transmission of each sound pulse when a reflection of that pulse can be expected to be received from any vehicle irrespective of its height. The high vehicle reflection gated generator 23 demarcates an interval of time which overlaps that demarcated by the gate generator 13 but encompasses only the expected time reception of a reflection pulse from a high vehicle, i.e., one whose height is substantially above that of the average passenger car. Another subsequent time interval is demarcated by the pavement reflection gate generator 14 and encompasses the interval of time during which a pavement reflection can be expected to be received.

The reflection pulses are all amplified by amplifier 15, and after being rectified and filtered by the rectifier-filter 16, are applied to the all-vehicle reflection gated amplifier 17, the high-vehicle reflection gated amplifier 24, and the pavement reflection gated amplifier 18. These gated amplifiers are, respectively, gated by the voltages derived from the gate generators 13, 23 and 14 previously referred to. As a result, when no vehicle is present, each reflected sound pulse results in a corresponding output from the pavement reflection gated amplifier 18, and this output is then applied to one input of flip-flop 19. When any vehicle is within the sound beam, each reflected sound pulse produces an output from the gated amplifier 17, and this output is then applied to the other input of flip-flop 19.

As long as flip-flop 19 receives successive input pulses from amplifier 18, it remains in a first one of its two stable states. Therefore, it remains in such first state as long as no vehicle is within a sound beam. Flip-flop 19 is operated to its opposite state, however, when a vehicle is within a sound beam so that it receives successive input pulses from amplifier 17 instead of from amplifier 18.

Condition detector 20 is connected to flip-flop 19 and senses which of its two states flip-flop 19 is in at any time. Whenever condition detector 20 senses that flip-flop 19 is in the condition it assumes whenever it is constantly receiving output pulses from amplifier 18, it then acts upon relay control circuit 21 to cause relay AV to be picked up so that front contact 22 of this relay is closed. On the other hand, when condition detector 20 is in the opposite of its two states by reason of having sensed that flip-flop 19 is in the condition it necessarily assumes whenever it receives successive pulses from amplifier 17, then relay control circuit 21 is operated to the condition where relay AV is dropped away. At such time, front contact 22 of relay AV is open.

From this description, it can be seen that the vehicle detector described in FIG. 4 is of the type which is a "presence" detector in that relay AV is dropped away throughout the time that a vehicle is detected as being within the sound beam. The various component values affecting the time constants associated with this detector are so chosen that the response and release times for relay AV will be substantially identical. This is done so that the drop-away time of relay AV will tend to be closely proportional to the length of time that the vehicle is within the sound beam.

Another distinctive characteristic of the vehicle detector of FIG. 4 is that it provides a high degree of discrimination against spurious objects. More specifically, in order for a vehicle to be detected, it is first necessary that the normally received pavement reflections be no longer received and that concurrently therewith vehicle reflection pulses be received. Before the apparatus can be restored to its normal condition so that it can thereafter detect a subsequent vehicle, it is necessary that the vehicle reflections cease and that the pavement reflection again be restored. These multiple requirements ensure that only a vehicle will ordinarily provide operation of the detector relay AV. Moreover, a convertible auto having sound reflecting surfaces only at its front and rear deck portions cannot possibly be counted as two separate vehicles since the absence of pavement reflection pulses when the cloth top is within the sound beam prevents the detector relay from dropping away. These characteristics of the vehicle detector of FIG. 4 are fully set forth in Patent 3,042,899, issued July 3, 1962, which may also be referred to for a more detailed description of the mode of operation of flip-flop 19, condition detector 20, and relay control circuit 21.

Whenever a high vehicle passes the detector location, the pulse which is applied to gated amplifier 24 occurs during the time that this amplifier is receiving its gating voltage from the gated generator 23. Because of this, each such input pulse results in the application of a corresponding output pulse to the relay control circuit 29. When a predetermined plurality of such pulses have been applied to relay control circuit 29 in close succession, this relay control circuit is operated to a distinctive condition wherein the high vehicle relay HV is dropped away.

Although the vehicle detector of FIG. 4 is disclosed as being the pulsed ultrasonic type, it is to be emphasized that it is by no means essential that a vehicle detector of this particular type be used to practice the present invention. It is only necessary that the detector be generally of the type which will provide an output for each vehicle whose duration is proportional to the length of time that the vehicle requires to pass a given point.

*Detailed circuit description—FIGURES 1A, 1B*

Referring again to the circuit diagram of FIGS. 1A and 1B, each dropping away of relay AV when a vehicle is detected causes capacitor 45 to charge through back contact 46 and through resistor 47 to (+). When the vehicle leaves the detection zone, front contact 46 closes and the charged capacitor 45 then discharges through the winding of relay R1, causing this relay to pick up. (When this happens, front contact 48 of relay R1 closes, and the winding of relay R1 then is energized through back contact 49 of relay R3, resistor 50, and through front contact 48 of relay R1 to the winding of relay R1.) Usually, relay R2 is dropped away as shown so that its back contact 51 is closed, thereby permitting energy to be applied from the terminal (+) to buss 52 and thence through diode 53 and front contact 54 of relay R1 to the winding of relay R3. Therefore, relay R3 picks up immediately upon the picking up of relay R1. Back contact 49 of relay R3 then opens but relay R1 cannot release immediately because the now-charged capacitor 55 discharges through resistor 56, resistor 50, and front contact 48, through the winding of relay R1 so that relay R1 remains picked up for a time. However, eventually relay R1 drops away and this opens the circuit to relay R3 at front contact 54 so that relay R3 drops away. While relay R3 is picked up, its front contact 57 is closed thereby shunting wires 58 and 59 which connect to the all-vehicle counter 36. This shunting action causes counter 36 to register one additional count.

In a similar manner, each vehicle detected by detector 35 releases relay AV momentarily and picks up both relays R1 and R3 thereby supplying one additional count to counter 36. Periodically, as will be seen, counter 36 acts upon printer 37 to print upon a tape or to punch upon a card the number of counts then registered by counter 36, and if the periodic intervals is one minute or one hour, the number printed upon the tape or punched on the card represents the number of vehicles detected in the last minute, or hour, as the case may be. Immediately after this recording operation, counter 36 is reset to zero so that it can restart the counting operation for the newly-started measuring interval.

It may very well happen that a vehicle is detected at approximately the same instant that the recording and resetting operation of counter 36 takes place. Even though only a very short time is required within which to record the count registered by counter 36 and then reset this counter to zero, it is also true that detector 35 may operate relay AV to the energized position at any instant, and if this should occur during the finite time required to execute the recording and resetting operation, such count would likely be lost. Therefore, it is necessary that the apparatus of this invention provide that an input count intended for counter 36 and occurring when recording and resetting of counter 36 has begun shall be momentarily stored and applied to counter 36 at the conclusion of the resetting operation. This function is provided by a novel interlocking arrangement between the means coupling detector 35 to counter 36 and the recording and resetting means.

More specifically, relay R2 is picked up at the very beginning of the recording and resetting operation and remains picked up until this is completed. Throughout this time, any vehicle detection is momentarily stored and applied to counter 36 only after relay R2 has been restored to its normal dropped-away condition at the end of the counter resetting operation. Thus, assuming that relay R2 is picked up, back contact 51 of this relay is open so that buss 52 is deenergized. Accordingly, when relay R1 picks up and closes its front contact 54, there can be no energization of relay R3 since there is no electrical energy then appearing on buss 52. Since relay R3 cannot pick up, there can be no shunting of wires 58 and 59 and no operation of counter 36.

During this time, when relay R2 is picked up and relay R3 is prevented from picking up, relay R1 is maintained continually energized through back contact 49 of relay R3. When the recording and resetting operation is complete and relay R2 drops away, energy is again applied to buss 52 and relay R3 can then be energized through front contact 54 of relay R1. Once a recording and resetting operation has been initiated as evidenced by the picking up of relay R2, any actuation of relay AV thereafter is stored by relay R1. When relay R2 drops away at the end of the resetting operation, relay R3 is free to pick up and actuate counter 36, and relay R1 is then restored to its normal condition.

Once relay R3 has picked up, it is energized through its own front contact 49, and the only way that it can then become deenergized is for relay R1 to drop away so that front contact 54 will open. This ensures that once a counting operation has been initiated and relay R3 has been picked up, it will not be interrupted by a picking up of relay R2 and the opening of back contact 51 which deenergizes buss 52. Any such counting operation is assured of being completed.

The vehicle classification detector 65 of FIG. 1A is shown as controlling the high vehicle relay HV. This relay HV is coupled to the high vehicle counter 38 by a circuit means which is identical to that just described for the relay AV. Thus, each high vehicle detected and resulting in an actuation of relay HV is counted by counter 38.

Before describing in detail the manner in which the actuations of relay AV control the application of counting pulses to counter 39, it is believed expedient to described the circuits which provide for the recording and restoration operations of the various counters. FIG. 1A discloses a timer 66 which is continually energized and is preferably of the synchronous type so that it will periodically close front contact 67 at accurately timed intervals. The frequency of closure of contact 67 may be selected to be any convenient value; under conditions where the apparatus is to be used to record high values of traffic volume and lane occupancy as on a heavily travelled city thoroughfare, it may be desirable to provide for successive measuring intervals of one minute duration in which event the printed tape will record volume in terms of vehicles per minute. On the other hand, measuring intervals of fifteen minutes or one-hour duration are also entirely practical, and it may be desirable to provide a plurality of timers in the apparatus with means for selecting the particular timer which is to be effective in any one given installation or, alternatively, it may be preferable to use a single timer of a type whose frequency of contact closure may be adjustable as desired. It may also be desired to utilize one short interval timer with counting and dividing circuits for providing pulses defining longer intervals as desired, e.g., a one minute timer and a divider capable of being set at 10 or 60 to provide pulses at intervals of 10 minutes or 60 minutes respectively by counting the basic one minute impulses.

Assuming that timer 66 times successive one-minute intervals, front contact 67 will close for a brief interval once each minute, and capacitor 68 is normally charged through resistor 69 when back contact 67 is closed then discharges through the winding of relay R4 to pick this relay up. At the same itme, capacitor 68 discharges through diode 70 and resistor 71 and the winding of relay R5. Relay R5 may alternatively be picked up independently of the foregoing circuit by actuation of the manually-operable push-button PB. Normally, however, it is the momentary closure of front contact 67 of timer 66 which causes the picking up of both relays R4 and R5.

Capacitor 72 is normally charged through back contact 73 of relay R5 and through resistor 74. However, when relay R5 picks up in the manner just described, this charged capacitor discharges through resistor 75 and through the winding of relay R2. When relay R2 picks up, a similar capacitor discharging action occurs in that the then-charged capacitor 76 is connected in series with the winding of relay R6 through front contact 77 of relay R2. Thus, both relays R2 and R6 are now picked up. As soon as relay R6 picks up, a stick or holding circuit is completed through its front contact 78 to provide energy through resistors 79 and 80 to the winding of relay R2.

Another result of the picking up of relay R6 is the charging of capacitor 81 through resistor 82 and front contact 83 of relay R6. Relay R6 remains picked up for a length of time which is dependent upon the time constant for the discharging of capacitor 76. Since the actual recording operation does not start until relay R6 drops away, this time constant is selected, preferably by choosing an appropriate value for the capacitance of capacitor 76, to delay the dropping away of relay R6 for a sufficient length of time to permit any counting operation, initiated prior to the picking up of relay R2, to be completed. More specifically, as just stated, the dropping away of relay R6 initiates the recording and resetting operation of the various counters shown in FIG. 1B. Also, according to the preceding description, no counting operation can be initiated on these counters after relay R2 has picked up; however, a counting operation may have been initiated just prior to the picking up of relay R2, and such counting operation must now be given an opportunity to be completed and it is for this reason that the releasing of relay R6 is delayed for some suitable interval following the picking up of relay R2.

Eventually, however, relay R6 does drop away and when this occurs charged capacitor 81 is connected through back contact 83 of relay R6 in series with the winding of relay R7, thereby causing relay R7 to pick up. When this happens, front contact 84 of relay R7 closes to provide an alternate circuit for energizing relay R2. This current can now flow through diode 85, resistors 79 and 80, to the winding of relay R2 so that this relay continues to remain picked up at this time.

Another result of the picking up of the relay R7 is the completion of a circuit through its front contact 84 to apply energy through resistor 86 to the winding of relay R8. When this happens, energy is applied from (+) and through front contact 87 of this relay to print command buss 88. This energizes each of the counters 36, 38 and 39 and also the digital clock 89 thereby causing each of these devices to then record its currently-registered count by means of printer 37 on a paper tape or punched card or other suitable recording means.

A further result of the picking up of relay R8 is the closure of its front contact 90 which charges capacitor 91 through resistor 92. Eventually, relay R7 drops away since it is energized only as a result of the transfer of a charge to its winding from capacitor 81. Incidentally, the time constant for the discharging of capacitor 81 is selected so as to maintain relays R7 and R8 picked up for a long enough time to effect the recording operation by printer 37. However, when relay R7 is released, thereby releasing also relay R8, back contact 90 of relay R8 closes, thereby picking up relay R9 as a result of the discharging of capacitor 91 through its winding. A circuit is now again provided to maintain relay R2 energized through front contact 93 of relay R9. At this time, relay R8 is dropped away but relay R9 is picked up, and a circuit is then completed from a (+), through back contact 87 of relay R8, and front contact 94 of relay R9, to energize reset buss 95. This energization of the reset buss energizes an input wire of each of the counters 36, 38, and 39 to thereby reset each of these devices to zero. The charge derived from capacitor 91 maintains relay R9 energized only for a rather brief interval which is long enough, however, to reset each of the enumerated devices. When relay R9 drops away, the recording and resetting conditions are fully completed, and it is then again permissible to engage in further counting operations. To permit this, relay R2 is now released by the opening of front contact 93 of relay R9.

Since timer 66 closes its front contact 67 at regularly prescribed intervals, it becomes possible to provide on the recording tape or card a digital record of time so that each digitally-recorded measurement of vehicle volume and occupancy may readily be referred to the time at which each measurement is recorded. This is accomplished by providing a digital clock 89 which responds to each actuation of contact 67 by timer 66 to record the current time. Digital clocks of this type are well-known and may be organized to provide, by means of four digits, the hours and minutes time representation. If front contact 67 of timer 66 is closed momentarily once each minute, this contact actuation may be used to advance by one minute the time representation registered by clock 89. At the same time, the energization of the print command buss 88 will cause the then-registered time to be recorded upon the tape or card by printer 37. Since the digital clock 89 is to provide a continuing record of current time, it is not reset at each recording interval and thus there is no connection to the digital clock 89 from the reset buss 95.

To operate the digital clock 89 it is only necessary that front contact 97 of relay R11 be closed momentarily to shunt wires 98 and 99 which connect to the digital clock 89. The actuation of relay R11 results from the closure of front contact 65 of relay R4, which relay is picked up as soon as front contact 67 of timer 66 closes. The circuit organization by which the closure of front contact 65 of relay R4 results in the actuation of relay R11, with an interlock arrangement designed to prevent a conflict between the counting and recording-resetting operations, is identical to that previously described in connection with the operation of all-vehicle counter 36. In this case, since the actuation of clock 89 and also the recording and resetting operations for the entire system come about as the result of the closure of front contact 67 of timer 66, there ordinarily does not arise the situation where an intended actuation of digital clock 89 occurs when a recording-resetting operation is already underway. However, the interlocking arrangement is useful in that an interval of time is provided, as previously described, within which the digital clock 89 may be actuated before the actual recording and resetting operation is initiated. Moreover, in the event that a recording-resetting operation is initiated by actuation of pushbutton PB, it then necessarily follows that there may be an overlapping of the actuation of relay R5 stemming from the push-button actuation as opposed to an actuation of relay R4 by timer 66. In this case, also, the interlocking arrangement prevents a conflict and permits both the digital clock actuation and the system recording and resetting operations to be taken care of in an orderly manner.

As previously described, counter 39 registers a count which is a function of the percentage of time that relay AV is dropped away throughout any given interval. The counting pulses which are applied to counter 39 are obtained originally from the sixty-cycle commercial power source which is generally available and which is shown in FIG. 1A as being applied to amplifier 100. The output of this amplifier thus comprises a sixty-cycle amplified signal which is normally grounded through closed front contact 101 of relay AV so that no input signal is applied to signal squarer 102. Throughout the time that a vehicle is detected by detector 35 and relay AV is dropped away, front contact 101 of this relay is open so that the amplified sixty-cycle signal at the output of amplifier 100 appears at the input of signal squarer 102, with the result that a square-wave signal at the 60-cycle-per-second frequency appears at the input to flip-flop 103.

Both flip-flops 103 and 104 are conventional scale-of-two dividing circuits which go through a complete cycle of operation for each two input pulses. As a result, the output of flip-flop 104 comprises a signal having a frequency one-fourth that of the input to flip-flop 103 and thus equally 15 cycles per second, or 900 cycles per minute. This lower frequency is applied to the cyclic decade counter 105 which may comprise a repeating-type-10-stage counter advancing one step in response to each input pulse. For each complete cycle of operation of counter 105, a pulse is applied to the one-shot multivibrator 106. This multivibrator has a period which is less than the period of the pulses applied to counter 105 so that it is restored to its normal condition prior to the occurrence of the next pulse from flip-flop 104. In other words, for each ten counts counted by counter 105, multivibrator 106 is operated once. Upon its restoration, multivibrator 106 applies an extra pulse over wire 108 to counter 105 to advance it one further step. By this means, counter 105 actually counts 1,000 pulses per minute even though it receives only 900 pulses per minute from flip-flop 104. Further, since multivibrator 106 is operated once for each ten pulses counted by counter 105, this multivibrator actually operates at a frequency of 100 cycles per minute.

Each cycle of operation of multivibrator 106 triggers an operation of a similar one-shot multivibrator 107, and each operation of this multivibrator 107 causes a momentary releasing of relay R10 thereby causing its back contact 108 to close and shunt the input wires 109 and 110 of counter 39. Since multivibrator 107 operates with a frequency of 100 cycles per minute, relay R10 operates at a rate of 100 times per minute. In other words, relay R10 would be actuated 100 times if relay AV were dropped away continuously for one minute. From this, it can be understood that counter 39 will record the percentage of time throughout any given measuring interval that relay AV is dropped away. During each recording and resetting operation, negative biasing energy is removed from amplifier 111 and this preing vents any actuations of relay R10 so that occupancy counts cannot be fed to the counter throughout such time.

In FIGS. 1A and 1B the control of the percent occupancy counter 39 from the relay R10 is shown in its simplest form; but such control may be that shown in the modification of FIG. 5 which, although more complicated, may well provide greater accuracy and be preferable in practice.

This modified form consists in eliminating amplifier 111 of FIG. 1A, but feeding pulses from relay R10 to relays R100 and R300 in succession in the same manner as fully described in connection with relays R1 and R3 of FIG. 1A. In other words, the principles of control provided for the all vehicle counter 36 can also be applied to the presence occupancy counter 39 as shown in FIG. 5. This modification which provides for storage of pulses occurring during the printing and resetting operations is effective in preventing the loss of the pulses during such printing and resetting operation.

It is noted that the relay R300 includes a front contact 301 for controlling the presence occupancy counter 39 in the same manner as the front contact 57 of relay R3 in FIG. 1A controls the all vehicle counter 36. Also, the buss 52 shown in FIG. 5 would extend to the buss 52 of FIG. 1A when this modification of FIG. 5 is employed.

Flip-flop 104, counter 105, multivibrators 106 and 107, relay R10 and amplifier 111 are all illustrated in greater detail in FIG. 2. As previously mentioned, the output of flip-flop 104 comprises a square wave signal having a frequency of 15 cycles per second or 900 cycles per minute. These pulses are applied through capacitor 115 to the control grid of tube 116 whose grid is negatively biased as a result of its being connected to a more negative source of voltage at the junction of resistors 117 and 118 than is the cathode. Each positive-going voltage variation in the square-wave output of flip-flop 104 drives tube 116 conductive, thereby producing a negative-going plate voltage variation which is applied without time delay to guide electrode 121 of a poly-cathode glow counting tube 120 and with a slight delay to the other guide electrode 119, the delay being provided by the series combination of capacitor 122 and resistor 123.

Counting tubes of the type shown in FIG. 2 are well-known in the art and need not be described in detail here. Each pair of time-spaced pulses at the guide electrodes 119 and 121 transfer the glow from one cathode to the next and since the cathodes are located in a circular pattern, the tube operates in a cyclic manner with the glow always returning to the starting point for each ten pulses applied to the guide electrodes.

Each time that the glow reaches the number 10 cathode of the tube, there is a positive-going voltage pulse which appears across resistor 124 in the grid circuit of tube 125. This tube is interconnected with tube 126 to form a one-shot multivibrator which normally stands in the condition wherein tube 126 is conductive since its control grid is connected through resistor 127 to the (+) voltage source. However, the positive-going voltage pulse which occurs when the glow reaches the No. 10 cathode triggers this multivibrator to the opposite state wherein tube 126 becomes non-conductive and tube 125 becomes conductive. This condition is maintained for only a short while, however, and the multivibrator restores itself to the normal condition before the occurrence of the next positive-going trigger pulse at the control grid of tube 116. When the multivibrator including tubes 125 and 126 does restore itself to the normal condition, the voltage at the plate of tube 125 rises abruptly, thereby producing a positive-going pulse at the grid of tube 128 causing tube 128 to become momentarily conductive and producing a negative-going voltage pulse at the common plate connections of tubes 116 and 128. This produces a further pair of time-spaced pulses at guide electrodes 119 and 121 to transfer the glow from cathode No. 10 to cathode No. 1 of tube 120. Since this application of an extra input pulse to tube 120 occurs once for each complete counting cycle of this tube, it follows that tube 120 will count ten for each nine pulses received from flip-flop 104. Also, it follows that tube 120 then counts at the rate of 1,000 pulses per minute whenever relay AV is dropped away even though flip-flop 104 cycles at the rate of 900 times per minute.

The arrangement just described whereby multivibrator 106 provides an extra input pulse to counter 105 for each nine pulses provided by flip-flop 104 is advantageous where it is desired to provide a one-thousand count per minute counting rate of counter 105 by using the readily available 60-cycle per second commercial frequency. It is, of course, also within the scope of this invention to provide a frequency source providing directly the desired frequency which will produce the predetermined counting rate of counter 105. Assuming a desired counting rate of one thousand counts per minute for counter 105, this frequency could be provided directly by an oscillator or other fixed frequency source which directly produces the one thousand cycle per minute frequency.

Multivibrator 107 of FIG. 1A is represented in FIG. 2 by triode tubes 130 and 131 which are cathode-coupled through resistor 132. Since the control grid of tube 131 is connected to the terminal (+) through resistor 133, tube 131 is normally conductive and relay R10 is normally picked up. Under the usually encountered conditions where a recording-resetting operation of counters is not taking place, relay R2 is dropped away and its back contact 134 is closed so that a cutoff bias voltage from the terminal (—) is applied to the control grid of tube 135 so that this tube can have no effect upon the energization of relay R10.

Each time that the multivibrator including tubes 125 and 126 is restored to its normal condition with tube 126 conductive, there is a negative-going voltage variation at the plate of tube 126 which is coupled to the plate of tube 130 through capacitor 136. The resulting negative pulse at the control grid of tube 131 operates the multivibrator comprising tubes 131 and 130 from its normal condition for a brief time thereby removing the energization from the winding of relay R10 so that this relay can drop away. Shortly thereafter, tube 131 again becomes conductive and relay R10 is picked up.

If the recording-resetting operation of the counter should be taking place when tube 131 becomes non-conductive, relay R10 will be prevented from dropping away because the cut-off bias for tube 135 will then be removed by the opening of back contact 134 of relay R2. Relay R2 is picked up for only a very brief instant, however, since the recording-resetting operation takes place very quickly. The time constant for the operation of the multivibrator comprising tubes 131 and 132 is made long enough so that tube 131 will remain non-conductive for a sufficient length of time to ensure that relay R10 will be dropped away even if it should be momentarily prevented from being released by a momentary picking up of relay R2. If, on the other hand, due to printing and resetting time requirements, relay R2 must remain up for a relatively long time, a two-relay storage circuit organization may be employed between relay R10 and the presence occupancy counter 39 as above described in connection with FIG. 5. In this instance, the tube 135 of FIG. 2, corresponding to amplifier 111 in FIG. 1A, is *not* required, as previously mentioned in connection with the discussion of the modification of FIG. 5.

Since the multivibrator, including tubes 125 and 126, operates once for each ten pulses counted by counting tube 120, and since tube 120, as already described, counts at the rate of one thousand pulses per minute, relay R10 must be actuated at the rate of 100 times per minute during the successive intervals that relay AV is dropped away to register the presence of a vehicle. Consequently, since each momentary dropping away of relay R10 supplies one for the count to counter 39, this counter will record in terms of percent the amount of time during each one-minute measuring interval that relay AV is dropped away.

Having described a system for the digital measuring and recording of traffic volume and lane occupancy data, I wish it to be understood that various modifications, adaptations and alterations may be made to the specific embodiment shown without departing from the spirit or scope of my invention.

What I claim is:

1. Apparatus for periodically recording digital representations of the volume of vehicular traffic passing a monitoring location comprising in combination means responsive to the vehicles passing said location, means for counting the vehicles detected by said vehicle responsive means, demarcating means for timing successive measuring intervals of substantially equal duration, and means governed in part by said demarcating means for graphically recording at the end of each demarcated interval the count then registered by said counting means.

2. The apparatus of claim 1 in which said responsive means is operated only by each vehicle which passes said location and travels in a defined lane, whereby said recording means records the traffic volume in said lane.

3. In a system for providing periodic digital representations of vehicular traffic parameters, the combination comprising means responsive to each vehicle passing a detector location and producing at least one count for each such vehicle, at least one counting means governed at least in part by said vehicle responsive means for registering the randomly-occurring counts produced by said vehicle responsive means, timing means for periodically resetting said counting means, and storage means for each counting means for momentarily storing any count produced by said vehicle responsive means and occurring during the execution of said resetting operation, said storage means applying said stored count to said counting means when said resetting operation is completed.

4. In a system for periodically obtaining digital representations of traffic lane occupancy the combination comprising, a vehicle detector defining a detection zone in said lane and being operated to a distinctive condition by each vehicle passing through said zone and remaining in said distinctive condition for a length of time proportional to the transit time of said vehicle through said detection zone, a frequency source generating a substantial number of cycles in the minimum expected transit time of a vehicle through said detection zone, a first cyclical counting means governed jointly by said frequency source and by said vehicle detector for cumulatively counting the cycles of said frequency occurring during successive intervals that said vehicle detector is in said distinctive condition, a second counting means coupled to said first counting means and counting at a submultiple rate of said first counting means the counts registered by said first counting means, whereby the incremental count registered by said second counting means over any predetermined interval provides a measure of lane occupancy.

5. The invention as defined in claim 4 wherein periodic timing means resets said second counting means at the end of each predetermined interval.

6. The invention as defined in claim 5 wherein said frequency of said source and the ratio of counting rates of said first and second counting means is selected to cause said second counting means to count at the rate of 100 counts per minute and said predetermined interval is one minute, whereby said second counting means at the end of each minute demarcated by said timing means registers in percent the lane occupancy.

7. The invention as defined in claim 5 in which recording means is governed by said timing means to record the count registered by said second counting means just prior to its being reset by said timing means.

8. Apparatus for measuring a traffic congestion parameter comprising in combination, at least one vehicle presence detector for detecting vehicles traveling along a highway, said detector defining a detection zone and producing a control manifestation for each vehicle which is representative of the occupancy time of said vehicle in said detection zone, signal accumulating means, signal storage means for storing a signal whose value is representative of said traffic congestion parameter, means for demarcating successive measuring intervals each of predetermined length, means controlled by said detector and by said demarcating means for adding an amount of signal to said signal accumulating means in each said measuring interval which is proportional to the cumulative vehicle detection time of each said detector over the duration of said measuring interval, and means controlled by said demarcating means for altering the signal stored in said storage means each said measuring interval by an amount proportional to the difference between a predetermined fraction of the amount of signal until then stored in said storage means and a predetermined fraction of the amount of signal added to said signal accumulating means in the last-completed measuring interval.

9. The apparatus of claim 8 in which both said signal accumulating means and said signal storage means comprising digital count registering means, and said signal adding means includes a source of repetitive pulses having a predetermined fixed rate and also includes means for coupling said source of pulses to said signal accumulating means whenever said vehicle detector is in a vehicle registering condition.

10. The apparatus of claim 8 in which said means controlled by said demarcating means substitutes at the end of each said measuring interval for the entire amount of signal then stored in said signal storage means the entire amount of signal accumulated in said accumulating means throughout the last-completed measuring interval.

11. Apparatus for measuring a traffic congestion parameter comprising in combination, at least one vehicle detector for detecting vehicles traveling along a highway, said detector defining a detection zone and producing a control manifestation for each vehicle passing through said detection zone, signal accumulating means, signal storage means for storing a signal whose value is representative of said traffic congestion parameter, means for demarcating successive measuring intervals each of predetermined length, means controlled by said detector and by said demarcating means for adding an amount of signal to said signal accumulating means for each vehicle detected by said vehicle detector during any said measuring interval, and means controlled by said demarcating means for altering the signal stored in said storage means once each said measuring interval by an amount proportional to the difference between a predetermined fraction of the amount of signal until then stored in said storage means and a predetermined fraction of the amount of signal added to said signal accumulating means in the last-completed measuring interval.

12. The apparatus of claim 11 in which said detector produces one discrete signal for each vehicle passing through its associated detection zone, whereby said signal stored in said storage means is representative of vehicle volume.

13. Apparatus for measuring the traffic parameter of lane occupancy comprising in combination, vehicle detector means of the presence-detecting type defining a detection zone traversed by a vehicle travelling along said lane and demarcating the occupancy time of each vehicle passing through said detection zone, digital signal accumulating means, a source of repetitive signals of a predetermined frequency, means controlled by both said source and by said vehicle detector for adding to the signal stored in said accumulating means at a constant rate throughout each vehicle detection period, first means for periodically decreasing the digital signal stored in said signal accumulating means by an amount proportional to the value of the signal then stored in said digital signal accumulating means, and second means responsive to the value of the signal in said accumulating means prior to the decreasing of said signal by said first means for providing a representation of vehicle lane occupancy.

14. In a system for providing periodical digital representations of vehicular traffic parameters, the combination comprising means responsive to each vehicle passing a detector location and producing at least one count for each vehicle detected, at least one counting means for registering the randomly-occurring counts produced by said vehicle-responsive means, timing means for periodically re-setting said counting means, storage means for each counting means for momentarily storing any count produced by said vehicle responsive means and occurring during the execution of said re-setting operation, said storage means applying said stored count to said counting means when said re-setting operation is completed, said counting means receiving one count for each vehicle detected by said vehicle responsive means, count recording means, said timing means just prior to said re-setting operation recording the count then registered by said counting means, digital clock means being advanced periodically by said timing means, said recording means also recording concurrently both the count registered by said counting means and the time then registered by said digital clock means.

15. In a system for providing periodic digital representations of vehicular traffic parameters, the combination comprising means responsive to each vehicle passing a detector location and producing one count for each such vehicle, one counting means governed in part by said vehicle responsive means for registering the randomly-occurring counts produced by said vehicle responsive means, timing means for periodically resetting said counting means, and storage means for each counting means for momentarily storing any count produced by said vehicle responsive means and occurring during the execution of said resetting operation, said storage means applying said stored count to said counting means when said operation is completed.

16. In a system for providing periodic digital representations of vehicular traffic parameters, the combination comprising means responsive to each vehicle passing a detector location and producing at least one count for each such vehicle, at least one counting means governed at least in part by said vehicle responsive means for registering the randomly-occurring counts produced by said vehicle responsive means, timing means for periodically resetting said counting means to an initial zero count condition, and storage means for each counting means for momentarily storing any count produced by said vehicle responsive means and occurring during the execution of said resetting operation, said storage means applying said stored count to said counting means when said resetting operation is completed.

17. In a system for providing periodic digital representations of vehicular traffic parameters, the combination comprising means responsive to each vehicle passing a detector location and producing at least one count for each such vehicle, at least one counting means governed at least in part by said vehicle responsive means for registering the randomly-occurring counts produced by said vehicle responsive means, timing means for periodically resetting said counting means to an initial zero count condition, and storage means for each counting means for momentarily storing any count produced by said vehicle responsive means and occurring during the execution of said resetting operation, said storage means applying said stored count to said counting means when said resetting operation is completed, and count recording means, said timing means at the end of each said interval and just prior to said resetting operation controlling said count recording means to record the count then registered by said counting means.

References Cited by the Examiner

UNITED STATES PATENTS

| | | | |
|---|---|---|---|
| 2,186,922 | 1/1940 | Hampton et al. | 235—92 |
| 2,594,276 | 4/1952 | Barker et al. | |
| 2,878,467 | 3/1959 | Barker et al. | |
| 3,087,140 | 4/1963 | O'Neill | 340—38 |
| 3,097,295 | 7/1963 | Williams. | |
| 3,109,926 | 11/1963 | Bolton | 235—151 X |
| 3,114,891 | 12/1963 | Auer. | |
| 3,141,612 | 7/1964 | Bolton | 340—38 X |
| 3,167,377 | 1/1965 | Pelavin | 346—14 |

MALCOLM A. MORRISON, *Primary Examiner.*

I. KESCHNER, *Assistant Examiner.*